(12) United States Patent
Hluchyj et al.

(10) Patent No.: US 6,282,193 B1
(45) Date of Patent: Aug. 28, 2001

(54) APPARATUS AND METHOD FOR A REMOTE ACCESS SERVER

(75) Inventors: Michael G. Hluchyj, Wellesley; Anthony J. Risica, Franklin, both of MA (US)

(73) Assignee: Sonus Networks, Westford, MA (US)

( * ) Notice: Subject to any disclaimer, the term of this patent is extended or adjusted under 35 U.S.C. 154(b) by 0 days.

(21) Appl. No.: 09/138,182

(22) Filed: Aug. 21, 1998

(51) Int. Cl.[7] .................................................. H04Q 11/04
(52) U.S. Cl. ...................... 370/356; 370/355; 370/395; 370/401; 370/465
(58) Field of Search ...................... 370/285, 290, 370/291, 356, 395, 401, 402, 465, 466, 467, 489, 355, 403, 352; 375/222, 377

(56) References Cited

U.S. PATENT DOCUMENTS

| | | | |
|---|---|---|---|
| 5,852,609 | * 12/1998 | Adams, III et al. | 370/465 |
| 5,910,970 | * 6/1999 | Lu | 375/377 |
| 5,914,955 | * 6/1999 | Rostoker et al. | 370/395 |

* cited by examiner

Primary Examiner—Douglas Olms
Assistant Examiner—Shick Hom
(74) Attorney, Agent, or Firm—Bromberg & Sunstein LLP

(57) ABSTRACT

A remote access server and method for using the remote access server in a packet network. In one embodiment, the remote access server includes a packet switch fabric, a packet network server and a dial access server. The packet network server has a first port for sending and receiving packet-based signals with the packet switch fabric and a second port for sending and receiving packet-based signals with the packet network. The dial access server has a port for sending and receiving packet-based signals with the packet switch fabric and the dial access server has a first digital signal processor for performing signal processing on the packet-based signals. The packet switch fabric transfers packet-based signals among the packet network server, and the dial access server. In a further embodiment, the dial access server includes a second digital signal processor for performing signal processing on the packet-based signals. The first digital signal processor may be a channel signal processor and the second digital signal processor may be a packet protocol processor. The signal processors perform remote access signal processing. The packet protocol processor may perform dial-up Internet protocol support. The channel signal processor may perform modulation and demodulation of packet-based signals, transcoding of packet-based signals, and automatic modem adaptation.

59 Claims, 6 Drawing Sheets

APPARATUS AND METHOD FOR A REMOTE ACCESS SERVER

TECHNICAL FIELD

The present invention relates to networks and, more specifically, to remote access servers connecting to packet networks.

BACKGROUND ART

FIG. 1 shows a system diagram of typical remote access servers (RAS) 2 and the interconnections for connecting a subscriber to the Internet. Currently, dial-up Internet access is provided to a subscriber through a remote access server typically located within the local calling area of the subscriber and maintained by either an Internet Service Provider (ISP) or a local or inter-exchange carrier on behalf of an ISP. A subscriber using a personal computer 4 dials into the remote access server 2 via a modem (not shown) and initiates a setup with the remote access server 2. The call travels from the subscriber's modem to the telephone company's end office (EO) 6 which routes the call to the remote access server 2. The remote access server 2 identifies and verifies that the subscriber is permitted to make a connection and have access to the Internet during setup. The subscriber may then send and receive data with the Internet 8. The remote access server 2 provides the connection between the circuit-based network of the telephone system 3 and the packet-based network of the Internet 8. One drawback of this configuration is that it requires the deployment of remote access servers 2 in close proximity to the ISP subscribers, in order to avoid long distance or toll charges for the subscriber, thereby making upgrades and repairs difficult for an Internet service provider.

FIG. 2 illustrates the architecture of a prior art remote access server 2. The remote access server 2 receives telephone calls from the telephone network 3 into a circuit network server 12. The circuit network server passes the circuit-based signals of each telephone call to a dial access server 14 via a circuit switch fabric 13. The dial access server 14 demodulates the voice-band data of the circuit-based signals and extracts the Internet Protocol (IP) packets for routing to the appropriate Internet destination. The packets are passed to a packet network server 16 via a packet switch fabric 15. From the packet network server 16 they are distributed into the packet network 8. It is well known that a packet switch fabric 15 can be implemented with a variety of technologies, such as an arbitrated packet bus or a centralized switching module. The dial access server 14 uses the packet switch fabric 15 to move the extracted IP packets to a packet network server 16 and the associated packet network interface appropriate for delivering the packet to its intended destination. The architecture of FIG. 2 carries the cost and complexity burden of two separate and independent switch fabrics: one circuit and one packet. In addition, the time division multiplexed structure of circuit network interfaces make them more costly at higher rates than the corresponding packet network interfaces.

SUMMARY OF THE INVENTION

The invention provides, in a preferred embodiment, a remote access server and method for using the remote access server in a packet network. In one embodiment, the remote access server provides a packet switch fabric, a packet network server and a dial access server. The packet network server has a first port for sending and receiving packet-based signals with the packet switch fabric and a second port for sending and receiving packet-based signals with the packet network. The dial access server has a port for sending and receiving packet-based signals with the packet switch fabric and the dial access server has a first digital signal processor for performing signal processing on the packet-based signals. The packet switch fabric transfers packet-based signals among the packet network server, and the dial access server. In a further embodiment, the dial access server further includes a second digital signal processor for performing signal processing on the packet-based signals.

The first digital signal processor may be a channel signal processor and the second digital signal processor may be a packet protocol processor. The signal processors perform remote access signal processing. The packet protocol processor may perform dial-up Internet protocol support. The channel signal processor may perform modulation and demodulation of packet-based signals, transcoding of packet-based signals, and automatic modem adaptation.

In other embodiments the packet switch fabric may include a switching module, a packet bus or a cell bus.

The remote access server may further include a management server coupled to the packet switch fabric providing management of remote access server resources where the packet switch fabric also transfers packet-based signals to the management server.

In another embodiment the remote access server includes an interface module for receiving and sending packet-based signals having embedded information packets and sending and receiving the embedded information packets. The server also includes a modem module for receiving the packet-based signal, performing demodulation on the packet-based signal, and extracting the embedded information packets or receiving the information packets and creating a packet-based signal with embedded information packets. The server further includes a packet switch fabric enabling transfer of the packet-based signal and the embedded information packets among the interface module and the modem module.

Other objects and advantages of the present invention will become apparent during the following description of the presently preferred embodiments of the present invention taken in conjunction with the drawings.

DETAILED DESCRIPTION OF SPECIFIC EMBODIMENTS

Figure 1:
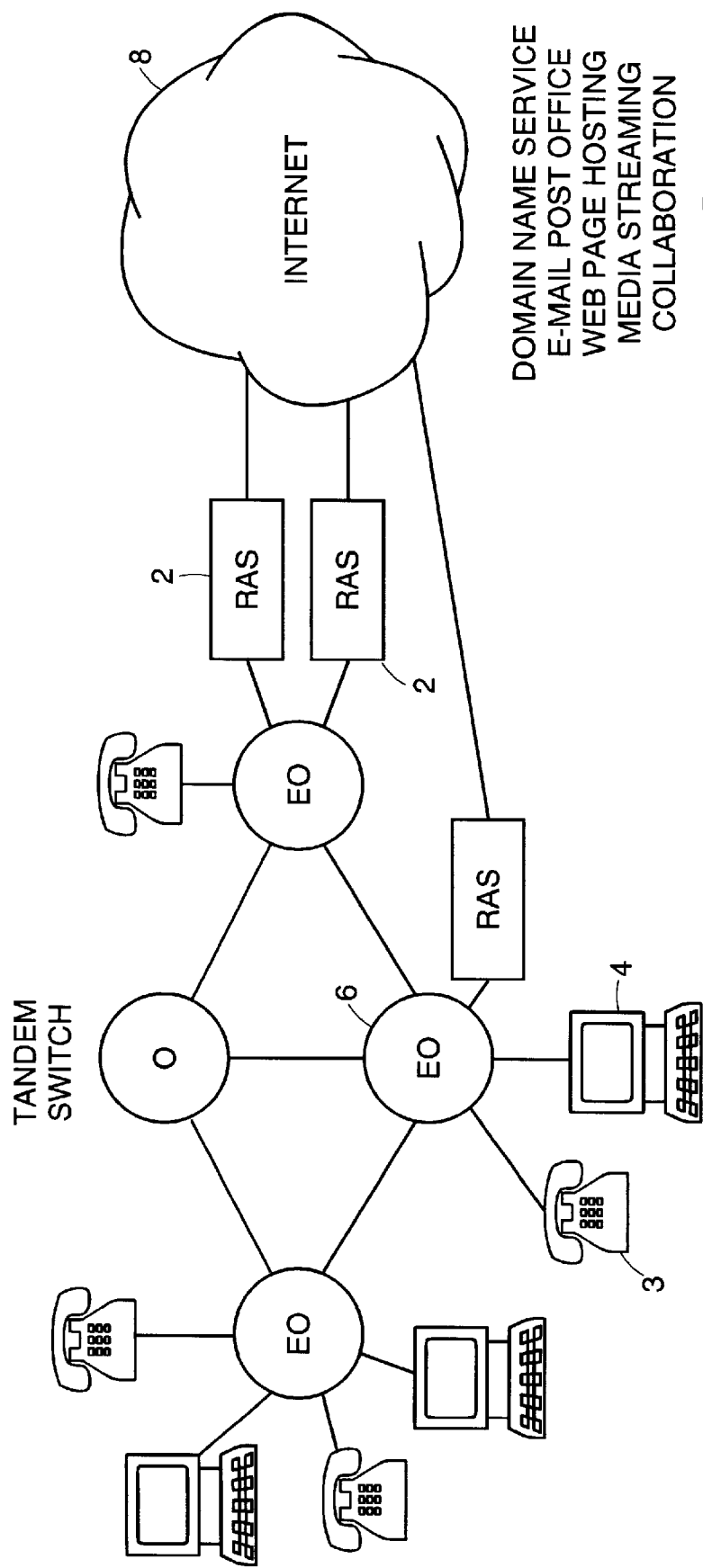
FIG. 1 is a block diagram of a prior art remote access server system.
Figure 2:
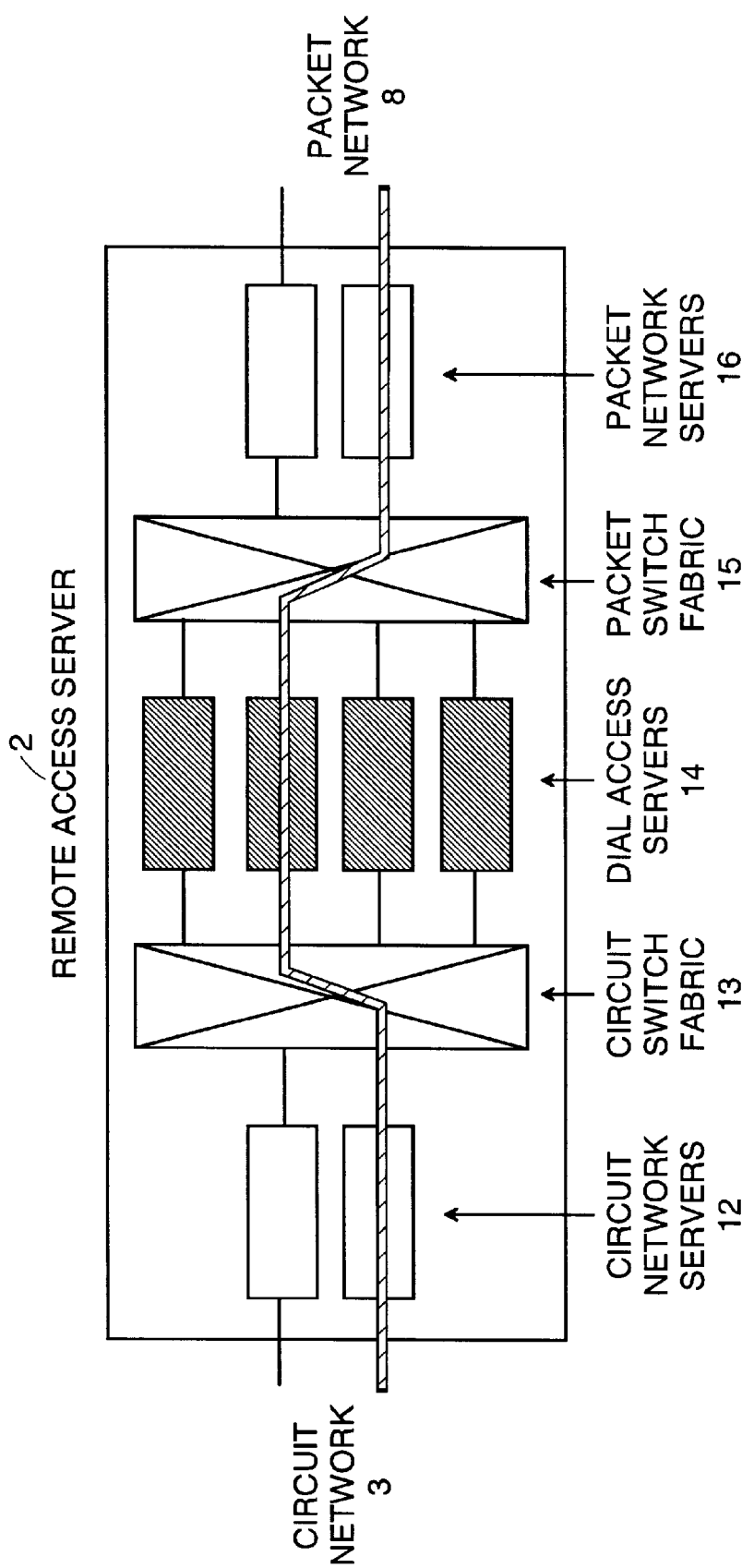
FIG. 2 is a block diagram of the architecture of a prior art remote access server.

The word "packet" as used herein defines a block of data with a header. The term packet includes cells. A packet header typically includes information, such as, source and destination addresses or a connection identifier. The header is used to direct the packet through the packet network. The term "digital signal processor" as used herein shall refer to a processor which is capable of manipulating a digital signal including packets. The term "packet switch fabric" as used herein refers to any device which contains the means to transfer packets between two or more devices, a packet switch fabric may be, but is not limited to, a packet bus, a switching module, a cell bus, a crossbar switch, a space division switch or a signal router. The term "multiplexer" shall refer to any device, which may perform multiplexing, demultiplexing, or both multiplexing and demultiplexing functions. The term "transcoding" refers to the process of transforming a signal from one state of coding to another. The term "circuit-based signal" refers to a data stream in a time-division multiplexed path containing digital information. The term "packet-based signal" refers to a data stream containing packets, wherein the packets contain digital information. The term, "packet adaptation" refers to the process of segmenting a circuit-based digital signal composed of samples and creating a packet from each segment by adding a header to form a packet-based signal. Packet adaptation also refers to the process of removing the header information from a packet and reassembling the packets to recreate the circuit-based digital signal. Packet adaptation may further include the process of time stamping. Hereinafter both special purpose digital signal processors and general purpose digital signal processors shall be referred to as digital signal processors (DSPs). The term "port" shall refer to any input or output. A port may include multiple inputs and multiple outputs. The term "remote access signal processing" refers to signal processing that is performed on a remote access server such as transcoding, modulating and demodulating data including support for modem standards, automatic modem adaptation, dial-up IP support, virtual private network (VPN) security and routing based on the dialed number or user ID. The term "channel signal processing" as used herein shall mean support for modem standards such as V.90, V.34bis, V.34, V.32bis, V.32, V.27 ter, V.22bis, V.22, V.21, Bell 212A, and Bell 103, along with V.42bis data compression, and MNP and MNP10-BC error correction for cellular connections. The term "packet protocol processing" as used herein shall refer to support for data protocols such as point-to-point protocol (PPP), serial line Internet protocol (SLIP), compressed serial line Internet protocol (CSLIP), TELNET, dynamic Internet Protocol (IP) address assignment, multilink PPP (MP), STAC/MS-STAC compression, and RFC 1144 TCP Header compression, along with support for user authentication and user service profile determination, such as, remote authentication dial-in user service (RADIUS), terminal access control system (TACACS), TACACS+challenge handshake authentication protocol (CHAP), password authentication protocol (PAP), and DIAMETER. The term packet protocol processing also refers to IP routing and forwarding based on IP addresses or other packet header information.

Figure 3:
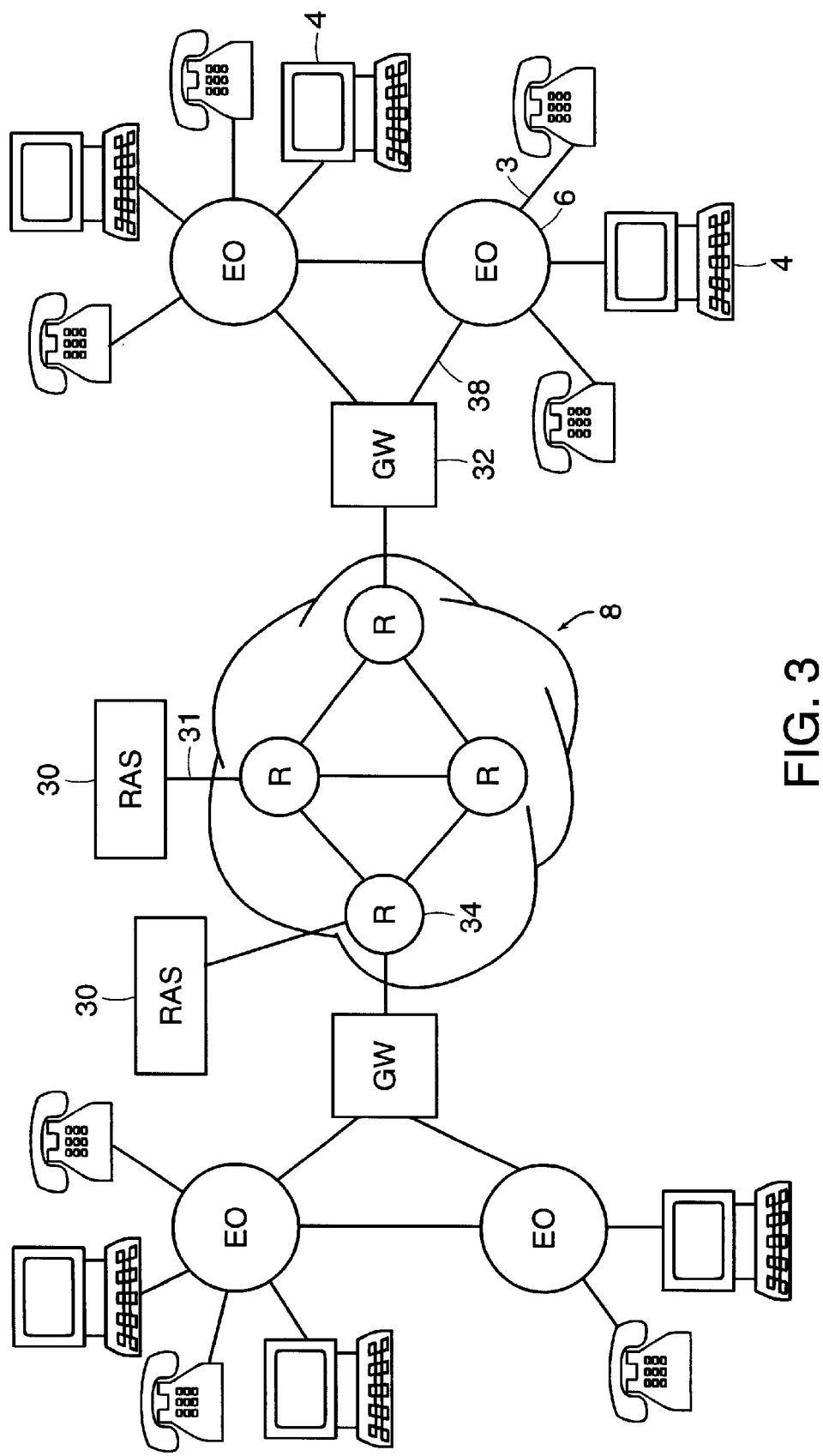
FIG. 3 is a block diagram of a system using a packet-based remote access server in an embodiment in accordance with the invention.

FIG. 3 shows an overview of a system for reducing the number of remote access servers 30 used for making dial-up access services available in accordance with one embodiment of the invention. An Internet subscriber, using a personal computer (PC) palm PC or other computing device 4, initiates a connection to an Internet Service Provider (ISP) through a dialed telephone call requesting a connection to a server or other subscriber within the Internet or other packet-based network. The subscriber is connected to an end office (EO) switch 6. The connection to the end office may take the form of an analog modem (not shown) attached to an analog line or the connection may be via an Integrated Service Digital Network (ISDN) modem (not shown) attached to an ISDN line. The dialed number of the ISP causes the EO circuit switch 6 to direct the call to a gateway 32 through the digital trunks 38 interconnecting the gateway to the EO switch 6. The dialed number may be used by the gateway 32 through a call routing table look-up to initiate a call set-up directly with the remote access server 30. Alternatively, the dialed number may provide the user with several service options offered by different server elements (e.g., FAX in addition to the remote access server) within the gateway itself or attached to the Internet Protocol (IP) backbone 8. Here the user may be prompted with an interactive voice response (IVR) application to select a service by entering dual tone multi-frequency (DTMF) digits in response to voice prompts. Based on the user selected service, the call is forwarded to a service element that offers that service. Included here is the remote access server service, and, if selected, the gateway 32 directs the call to the remote access server 30 using a call signaling protocol such as International Telecommunications Union (ITU) recommendation H.323 or Internet Engineering Task Force (IETF) Session Initiated Protocol (SIP). When the call set-up is processed at the remote access server 30, resource management functions within the remote access server 30 will ensure that sufficient resources exist to service the call before the call is allowed to go through. If there are sufficient resources, such as an appropriate dial access server within the remote access server 30, the resources will be assigned to the call and the remote access server 30 will acknowledge the gateway's request and indicate that the call can be accepted. The gateway 32 in turn will respond to the EO switch 6, which will put the call through to the remote access server 30.

An application running on the PC 4 creates information packets with the address of a destination server. The analog or ISDN modem embeds the information packets into the circuit-based connection for transmission first to the EO switch 6 and then to the gateway 32. In a preferred embodiment the embedded information packets are embedded IP packets. At this point, the gateway 32 converts, for the call, the circuit-based digital signal from its circuit network interface to the EO switch 6 to a packet-based signal by a standards-based packet adaptation protocol such as the IETF Real Time Protocol (RTP). The routers 34 and/or switches in the IP Backbone 8 forward the packet-based signal to a packet interface 31 of the remote access server 30. Based on an IP address of the remote access server 30 and user datagram protocol (UDP) port number within the packet headers of the packet-based signal carrying the embedded information packets for the call, the packet-based signal packets are directed within the remote access server to the dial access server assigned during call set up. For Internet services, the remote access server performs channel signal processing and packet protocol processing. The user now has full Internet access through the remote access server.

Figure 4:
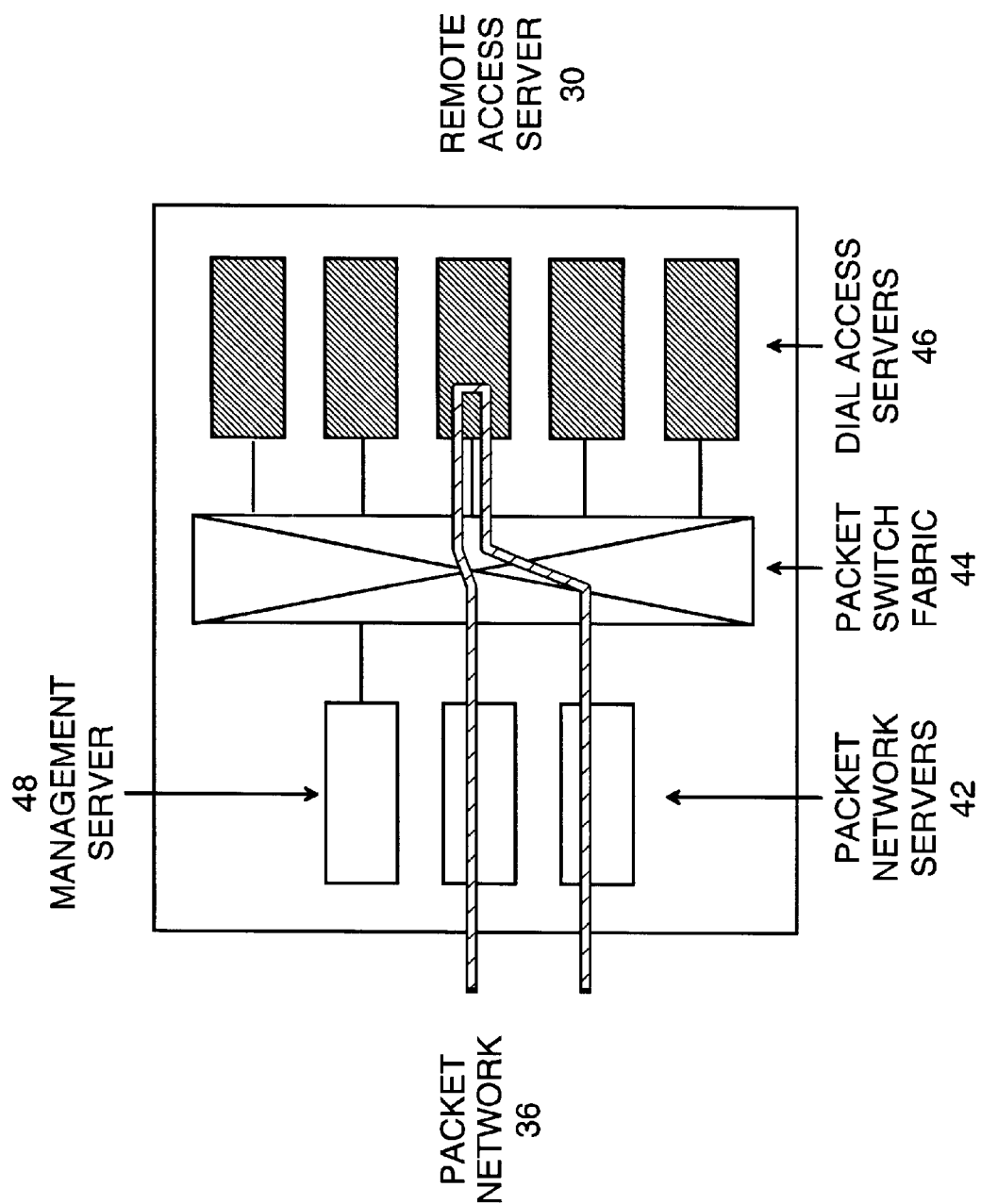
FIG. 4 is a block diagram of the components of a remote access server in accordance with an embodiment of the invention.

In one embodiment of the invention, the remote access servers are composed of multiple packet network servers 42 and multiple dial access servers 46 all coupled to a packet switch fabric 44, as shown in FIG. 4. Each server may be designed as a combination of integrated circuits and other components and placed on an individual integrated circuit card or module for insertion into a module receptor board. The packet switch fabric 44 may also be implemented as a module when the packet switch fabric 44 takes the form of a signal switcher, a router, or a packet bus with interface circuits.

In an embodiment, a remote access server includes packet network servers 42 which receive the packet-based signals from the packet network 36, and dial access servers 46 which extract the embedded information packets within the packet-based signals and direct the information packets to their final destination within the packet network 36. The packet network 36 may be the IP backbone of the Internet 8 or another packet-based network such as a packet-based intranet. The packet network servers 42 and the dial access servers 46 are linked with a packet switch fabric 44 in such a way that a packet-based signal may be directed between any two servers. Once the dial access server 46 has determined the destination of the embedded information packets, the information packets are directed to the appropriate packet network server 42 and then redirected into the appropriate packet network 36. In such an embodiment, Internet Service Providers need not have a remote access server 30 for every local calling area of the telephone system 3. Remote access servers 30 may be distributed throughout the packet network 36 in convenient locations for the Internet service providers, so that upgrades and maintenance may be performed more easily.

The packet switch fabric 44 transfers packet-based signals and information packets among packet network servers 42, and dial access servers 46. In an embodiment of the invention, the packet switch fabric 44 may be a packet bus. In another embodiment, the system may operate on ATM cells and the packet switch fabric 44 would be a cell bus. Packet network servers 42 and dial access servers 46 would be configured to handle cells in such an embodiment. The switching fabric within the remote access server which connects the packet network servers and the dial access servers may be implemented with a circuit switch fabric in an alternative embodiment. In such an embodiment, the packet network server performs packet adaptation converting the incoming packet-based signals into circuit based signals and the dial access servers are so equipped as to receive circuit based signals.

The remote access server may further include a management server 48 The management server 48 has overall responsibility for the management of resources including routing of the signals to the requested packet network and assignment of the appropriate dial access server. The management server 48 coordinates the overall operation of the remote access server, including the booting of the gateway on powerup, configuration of the gateway resources, recovery from component failures, and reporting of events, alarm and billing information to an external network management system (not shown).

Figure 5:
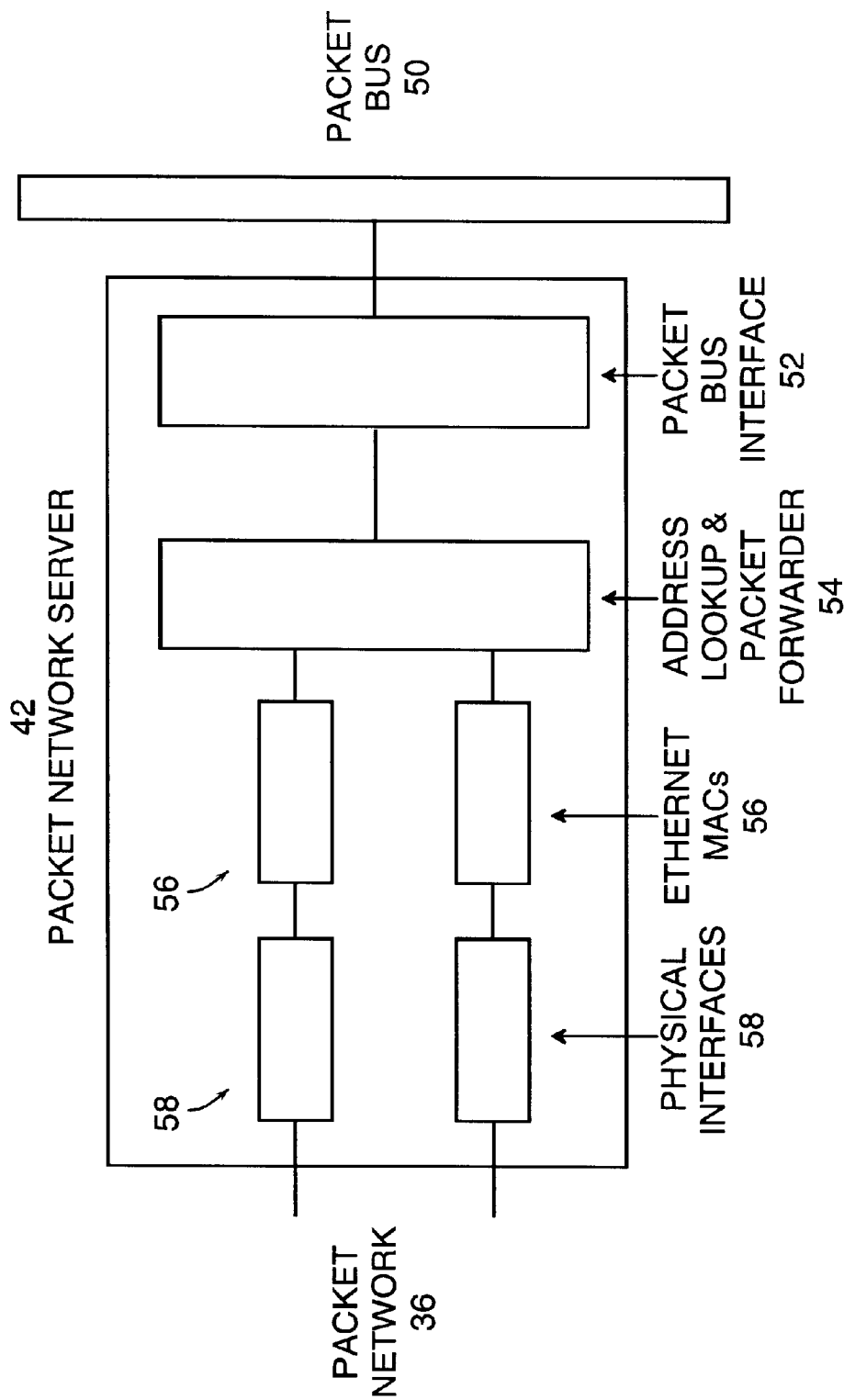
FIG. 5 is a block diagram of the components of a packet network server in accordance with an embodiment of the invention.

In an embodiment of the invention, each packet network server 42 (see FIG. 5) interfaces to a packet bus 50 via a packet bus interface 52 for sending and receiving packets to other packet network servers 42 or dial access servers 46, and interfaces to the packet network 36 by standard packet network interfaces 56 such as Ethernet. The packet network server 42 performs the packet switching functions of address lookup and packet forwarding. The address lookup and packet forwarder 54 may analyze the packet header to identify the assigned resources for the connection and may strip the IP and UDP header and insert an internal remote access service connection identifier for the packet-based signal. An Ethernet Medium Access Control (MAC) device 56 controls access to the packet network interface. A physical interface 58 or port provides the connection between a line in the packet network 36 and the remote access server 30. The physical interface 58 may be, but is not limited to, a coaxial interface, or a twisted pair interface for 10-base-T or 100-base-T connections.

Figure 6:
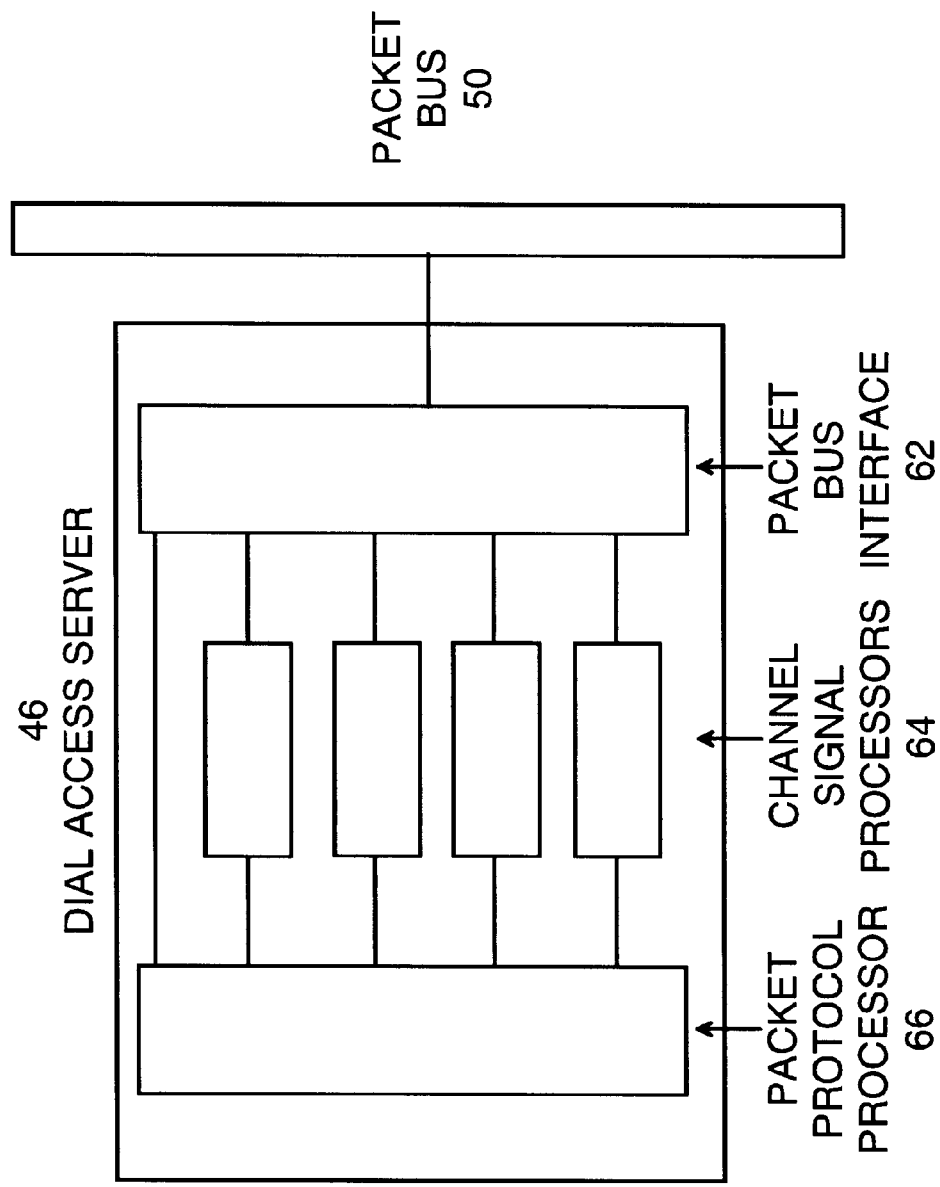
FIG. 6 is a block diagram of the components of a dial access server in accordance with an embodiment of the invention.

The dial access server of FIG. 6, in accordance with one embodiment of the invention, connects to a packet bus through a packet bus interface 62. In this embodiment, the dial access server contains two processors, a channel signal processor 64 and a packet protocol processor 66. The packet bus interface 62 directs the packets for the call to the channel signal processor 64 assigned during call set up. For an analog modem call, the channel signal processor 64 takes the arriving packet-based signal and demodulates the data, included here is support for automatic modem adaptation, modulation and demodulation, modem standards, transcoding including data compression, and error correction. For an ISDN modem call, the channel signal processor 64 extracts the digital data directly from the packet-based signal. The channel signal processor 64 forwards the digital data to the packet protocol processor 66 which provides support for data protocols.

The packet protocol processor 66, in coordination with the management server 48 of FIG. 4, provides dial-up Internet protocol support for user authentication and user service profile determination via protocols. Some basic security may be provided by Callback and Calling Line ID services or other authorization/authentication mechanisms such as PAP, CHAP, RADIUS and DIAMETER. The packet protocol processor 66 also provides the IP forwarding function for the embedded information packets. For example, selecting which packet interface the information packets should use to exit the remote access server 30 into the IP backbone 36. The IP backbone 36 may be the same or different than that from which the packet-based signal originally arrived to the remote access server 30. Packet interfaces may include local area networks (LAN) such as, Ethernet or wide area networks (WAN) such as, Frame Relay, asynchronous transfer mode (ATM) or synchronous optical network (SONET), and may support secure tunneling such as with the Point-to-Point Tunneling Protocol (PPTP) or L2TP.

Although various exemplary embodiments of the invention have been disclosed, it should be apparent to those skilled in the art that various changes and modifications can be made which will achieve some of the advantages of the invention without departing from the true scope of the invention. For example, internal processes within the remote access server may be achieved with circuit-based signals, however the signals which enter the remote access server and leave the remote access server are packet-based. These and other obvious modifications are intended to be covered by the appended claims.

What is claimed is:

1. A remote access server for a packet network, the remote access server comprising:

a packet switch fabric;

a packet network server having a first port for sending and receiving packet-based signals with the packet switch fabric and a second port for sending and receiving packet-based signals with the packet network; and a dial access server having a port for sending packet-based signals to and receiving packet-based signals from the packet switch fabric, the dial access server having a first digital signal processor for performing signal processing on the packet-based signals;

wherein the packet switch fabric transfers packet-based signals among the packet network server, and the dial access server.

2. The remote access server according to claim 1, wherein the dial access server further comprises a second digital signal processor for performing signal processing on the packet-based signals.

3. The remote access server according to claim 2, wherein the first digital signal processor is a channel signal processor.

4. The remote access server according to claim 3, wherein the second digital signal processor is a packet protocol processor.

5. The remote access server according to claim 4, wherein the signal processing performed on the channel signal processor is channel signal processing.

6. The remote access server according to claim 5, wherein the signal processing performed on the packet protocol processor is packet protocol processing.

7. The remote access server according to claim 6, wherein, the packet protocol processing performed on the second digital signal processor of the dial access server is dial-up Internet protocol support.

8. The remote access server according to claim 1, wherein the first digital signal processor of the dial access server further performs remote access signal processing.

9. The remote access server according to claim 8, wherein the remote access signal processing performed on the first digital signal processor of the dial access server is modulation and demodulation of packet-based signals.

10. The remote access server according to claim 8, wherein the remote access signal processing performed on the first digital signal processor of the dial access server is transcoding of packet-based signals.

11. The remote access server according to claim 8, wherein the remote access signal processing performed on the first digital signal processor of the dial access server is automatic modem adaptation.

12. The remote access server according to claim 6, wherein the packet switch fabric further comprises a switch for switching among the packet network server, and the dial access server.

13. The remote access server according to claim 6, wherein the packet switch fabric is a switching module.

14. The remote access server according to claim 6, wherein the packet switch fabric is a packet bus.

15. The remote access server according to claim 6, wherein the packet switch fabric is a cell bus.

16. The remote access server according to claim 6, further comprising:
a management server coupled to the packet switch fabric providing management of remote access server resources;
wherein the packet switch fabric also transfers packet-based signals to the management server.

17. The remote access server according to claim 14, wherein the dial access server comprises
a packet bus interface for interfacing with the packet bus and coupled to the channel signal processor;
wherein the channel signal processor is coupled to the packet protocol processor and the packet protocol processor is coupled to the packet bus interface.

18. The remote access server according to claim 17, wherein the packet bus interface further comprises a multiplexer.

19. The remote access server according to claim 1, wherein the remote access server is located in an area remote from an end office and operatively coupled to the end office via a telephony gateway.

20. The remote access server according to claim 19, wherein the gateway is located in a local call area for Internet Service Provider subscribers, in order to avoid long distance toll charges for the Internet Service Provider subscribers.

21. A remote access server for a packet network, the remote access server comprising:
a packet network server having a port for receiving an input packet-based signal from the packet network and for sending an output packet-based signal to the packet network; and
a dial access server having a port for sending a signal associated with the output packet-based signal to the packet network server and for receiving a signal associated with the input packet-based signal from the packet network server, the dial access server having a first digital signal processor for performing signal processing.

22. The remote access server according to claim 21, wherein the dial access server further comprises a second digital signal processor for performing signal processing.

23. The remote access server according to claim 22, wherein the first digital signal processor is a channel signal processor.

24. The remote access server according to claim 23, wherein the second digital signal processor is a packet protocol processor.

25. The remote access server according to claim 24, wherein the signal processing performed on the channel signal processor is channel signal processing.

26. The remote access server according to claim 25, wherein the signal processing performed on the packet protocol processor is packet protocol processing.

27. The remote access server according to claim 26, wherein the packet protocol processing performed on the second digital signal processor of the dial access server is dial-up Internet protocol support.

28. The remote access server according to claim 21, wherein the first digital signal processor of the dial access server further performs remote access signal processing.

29. The remote access server according to claim 21, further comprising:
a management server coupled to the packet network server and the dial access server providing management of remote access server resources.

30. A method for accessing a remote access server, the method comprising:
receiving a packet-based signal having embedded information packets into a packet network server;
transferring the packet-based signal from the packet network server to a packet switch fabric;
transferring the packet-based signal from the packet switch fabric to a dial access server;
performing signal processing on the packet-based signal, thereby extracting the embedded information packets;
transferring the information packets from the dial access server to the packet switch fabric;
transferring the information packets signal from the packet switch fabric to the packet network server;
sending the information packets from the packet network server.

31. The method according to claim 30, wherein the signal processing is remote access signal processing.

32. The method according to claim 31, wherein the remote access signal processing is transcoding.

33. The method for accessing a remote access server according to claim 30, wherein the remote access server is located in an area remote from an end office and operatively coupled to the end office via a telephony gateway.

34. The method for accessing a remote access server according to claim 33, wherein the gateway is located in a local call area for Internet Service Provider subscribers, in order to avoid long distance toll charges for the Internet Service Provider subscribers.

35. A method for accessing a remote access server, the method comprising:

receiving information packets into a packet network server;

transferring the information packets from the packet network server to a packet switch fabric;

transferring the information packets from the packet switch fabric to a dial access server;

performing signal processing on the information packets, thereby embedding the information packets into a packet-based signal;

transferring the packet-based signal from the dial access server to the packet switch fabric;

transferring the packet-based signal from the packet switch fabric to the packet network server;

sending the packet-based signal from the packet network server.

36. The method according to claim 35, wherein the signal processing is remote access signal processing.

37. The method according to claim 36, wherein the remote access signal processing is transcoding.

38. The method for accessing a remote access server according to claim 35, wherein the remote access server is located in an area remote from an end office and operatively coupled to the end office via a telephony gateway.

39. The method for accessing a remote access server according to claim 38, wherein the gateway is located in a local call area for Internet Service Provider subscribers, in order to avoid long distance toll charges for the Internet Service Provider subscribers.

40. A remote access server for a packet network, wherein the remote access server is located in an area remote from an end office and operatively coupled to the end office via a telephony gateway, the remote access server comprising:

a dial access server having a first digital signal processor for performing signal processing on packet-based signals; and a packet network server in signal communication with the dial access server, the packet network server sending packet-based signals and receiving packet-based signals via the gateway.

41. The remote access server according to claim 40, wherein the dial access server redirects the packet-based signals to a second server in the packet network.

42. The remote access server according to claim 40, wherein the dial access server redirects the packet-based signals to a second server in the packet network via a second gateway.

43. The remote access server according to claim 40, wherein the remote access server has two or more packet network servers, and a packet switch fabric directing packet-based signals between at least one of the packet network servers and the dial access server.

44. The remote access server according to claim 43, wherein the remote access server has two or more dial access servers, the packet switch fabric directing packet-based signals between at least one packet network server and at least one dial access server.

45. The remote access server according to claim 43, wherein the packet switch fabric further comprises a switch for switching among the packet network server, and the dial access server.

46. The remote access server according to claim 44, wherein the packet switch fabric is a switching module.

47. The remote access server according to claim 44, wherein the packet switch fabric is a packet bus.

48. The remote access server according to claim 44, wherein the packet switch fabric is a cell bus.

49. The remote access server according to claim 44, further comprising:

a management server coupled to the packet switch fabric providing management of remote access server resources;

wherein the packet switch fabric also transfers packet-based signals to the management server.

50. The remote access server according to claim 40, wherein the dial access server further comprises a second digital signal processor for performing signal processing on the packet-based signals.

51. The remote access server according to claim 50, wherein the first digital signal processor is a channel signal processor.

52. The remote access server according to claim 51, wherein the second digital signal processor is a packet protocol processor.

53. The remote access server according to claim 52, wherein the signal processing performed on the channel signal processor is channel signal processing.

54. The remote access server according to claim 53, wherein the signal processing performed on the packet protocol processor is packet protocol processing.

55. The remote access server according to claim 54, wherein the packet protocol processing performed on the second digital signal processor of the dial access server is dial-up Internet protocol support.

56. The remote access server according to claim 40, wherein the first digital signal processor of the dial access server further performs remote access signal processing.

57. The remote access server according to claim 56, wherein the remote access signal processing performed on the first digital signal processor of the dial access server is modulation and demodulation of packet-based signals.

58. The remote access server according to claim 56, wherein the remote access signal processing performed on the first digital signal processor of the dial access server is transcoding of packet-based signals.

59. The remote access server according to claim 56, wherein the remote access signal processing performed on the first digital signal processor of the dial access server is automatic modem adaptation.

* * * * *